(12) United States Patent
Nakazawa

(10) Patent No.: US 6,707,266 B2
(45) Date of Patent: Mar. 16, 2004

(54) MOTOR CONTROL DEVICE

(75) Inventor: Yosuke Nakazawa, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/277,148

(22) Filed: Oct. 22, 2002

(65) Prior Publication Data

US 2003/0173921 A1 Sep. 18, 2003

(30) Foreign Application Priority Data

Mar. 12, 2002 (JP) ......................................... 2002-067506

(51) Int. Cl.⁷ .................................................. A02P 7/00
(52) U.S. Cl. ........................ 318/432; 318/701; 318/700; 318/254; 318/138; 318/439
(58) Field of Search ................................. 318/701, 254, 318/439, 138, 459, 500, 700, 702, 703, 432

(56) References Cited

U.S. PATENT DOCUMENTS 5,854,547 A  12/1998  Nakazawa 6,427,105 B1 * 7/2002 Matsushita .................... 701/41
6,429,620 B2 * 8/2002 Nakazawa .................... 318/701
6,448,680 B1 * 9/2002 Akemakou ............. 310/156.41

* cited by examiner

*Primary Examiner*—Karen Masih
(74) *Attorney, Agent, or Firm*—Foley & Lardner

(57) ABSTRACT

A motor control device has a flux-weakening angle setting section that variably sets an angle of flux-weakening whereby correction is effected by a current instruction value in accordance with a torque instruction when flux-weakening control is performed to correct the current instruction value such that the terminal voltage of a permanent magnet reluctance motor that generates a combined torque of torque produced by a permanent magnet and reluctance torque does not exceed the maximum voltage of the inverter output. This flux-weakening angle setting section sets the flux-weakening angle in a direction in which the torque is practically invariant.

12 Claims, 10 Drawing Sheets

MOTOR CONTROL DEVICE

CROSS-REFERENCE TO RELATED APPLICATION

This application claims benefit of priority to Japanese Application No. JP 2002-67506 filed Mar. 12, 2002, the entire content of which is incorporated by reference herein.

BACKGROUND OF THE INVENTION

1. Field of the Invention

The present invention relates to motor control device that performs flux-weakening control of a motor, and more particularly relates to a motor control device applied to a permanent magnet reluctance motor that generates a combined torque of torque produced by a permanent magnet and reluctance torque.

2. Description of the Related Art

Conventionally, when performing inverter drive of a permanent magnet motor or reluctance motor used in applications such as electric trains or electrical automobiles, flux-weakening control is often performed so as to make the motor terminal voltage below the maximum voltage capable of being output by the inverter, in the case of fixed output operation during high-speed rotation.

In flux-weakening control of a permanent magnet motor, typically, an armature current i.e. a so-called minus d axis current is made to flow such that the magnetic flux produced by the current flowing in the armature is in the opposite direction to the magnetic flux of the permanent magnet.

Usually, also, flux-weakening control of a reluctance motor which has an axis (q axis) of larger inductance and an axis (d axis) of smaller inductance is performed by reducing the q axis current, which has the largest flux-weakening effect.

However, in the case of performing flux-weakening control of a permanent magnet reluctance motor in which a combined torque of the torque produced by permanent magnet flux and reluctance torque is generated, when the current for flux-weakening control is made to flow fixed on either axis of the d axis or q axis, depending on the magnitude of the current amplitude that is to be made variable by the torque that is desired to be output, a flux-weakening effect may not be obtained, with the result that control instability is produced in which the motor terminal voltage cannot be controlled to below the inverter output maximum voltage.

It is possible that the same phenomenon may occur also in so-called embedded permanent magnet motors, in which a combined torque of reluctance torque and permanent magnet torque dependent on the shape of a permanent magnet embedded in the interior of the rotor core is output.

As a method of solving this problem, the present inventors have previously proposed (Laid-open application number 2001-197800 in Japan, U.S. application Ser. No.: 09/751,387) a device for controlling a permanent magnet reluctance motor whereby stable and effective flux-weakening control is made possible irrespective of the torque output condition by making it possible to vary the direction of current flow for flux-weakening control in accordance with the magnitude of the torque instruction or current instruction in a permanent magnet reluctance motor.

However, this system is a method of solution that is principally aimed at stability and effectiveness of flux-weakening control and does not necessarily take into consideration ease of tracking a torque to the torque instruction value; thus it suffered from the problems of system control tending to become unstable due to runaway caused by a larger than anticipated torque being produced if the deviation between the actually generated torque and the torque instruction value became large, or to due to generation of mechanical vibrations.

SUMMARY OF THE INVENTION

Accordingly, one object of the present invention, when applied to a permanent magnet reluctance motor that generates a combined torque of torque produced by permanent magnet flux and reluctance torque, is to provide a novel motor control device whereby stable and effective flux-weakening control can be performed while outputting a torque that closely tracks the torque instruction value, irrespective of the torque output condition.

In order to achieve the above object, the present invention is constituted as follows. Specifically, in a motor control device comprising flux-weakening angle setting means that, when flux-weakening control is performed wherein the current instruction value is corrected such that the terminal voltage of the motor does not exceed the maximum voltage of the inverter output, variably sets an angle of flux-weakening whereby correction is effected by the current instruction value in accordance with a torque instruction, the flux-weakening angle setting means sets the flux-weakening angle in a direction in which the torque is practically invariant.

With the present invention, when applied to a permanent magnet reluctance motor that generates a combined torque of torque produced by permanent magnet flux and reluctance torque, it is made possible to variably set the direction of the current flowing for flux-weakening control taking into account not only the torque instruction but also the magnitude of the flux-weakening current; in this way, stable and effective flux-weakening control can be performed while outputting a torque that closely tracks the torque instruction value, irrespective of the torque output condition.

Also in order to achieve the above object, the present invention is further constructed as follows. Specifically, a motor control device comprising flux-weakening angle setting means that, when flux-weakening control is performed wherein the current instruction value is corrected such that the terminal voltage of the motor does not exceed the maximum voltage of the inverter output variably sets an angle of flux-weakening whereby correction is effected by said current instruction value in accordance with a torque instruction value, comprises:

single pulse waveform control means that controls the current such that a desired torque is obtained by altering the voltage phase, by outputting a single-pulse waveform that turns an inverter switching element ON/OFF once only in every cycle of the output frequency; and means for altering the voltage phase that sets the angle of flux-weakening in accordance with the torque instruction in a direction wherein the torque is practically invariant and such that the current feedback component in the direction perpendicular to the angle of flux-weakening becomes zero.

With the present invention, when applied to a permanent magnet reluctance motor that generates a combined torque of torque produced by permanent magnet flux and reluctance torque, it is made possible to variably set the direction of the current flowing for flux-weakening control taking into account not only the torque instruction but also the magnitude of the flux-weakening current; in this way, stable and effective flux-weakening control can be performed while outputting a torque that closely tracks the torque instruction value, irrespective of the torque output condition.

Also, thanks to the adoption of a single pulse waveform, the inverter voltage utilization rate can be improved, device costs can be lowered and higher efficiency can be achieved.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
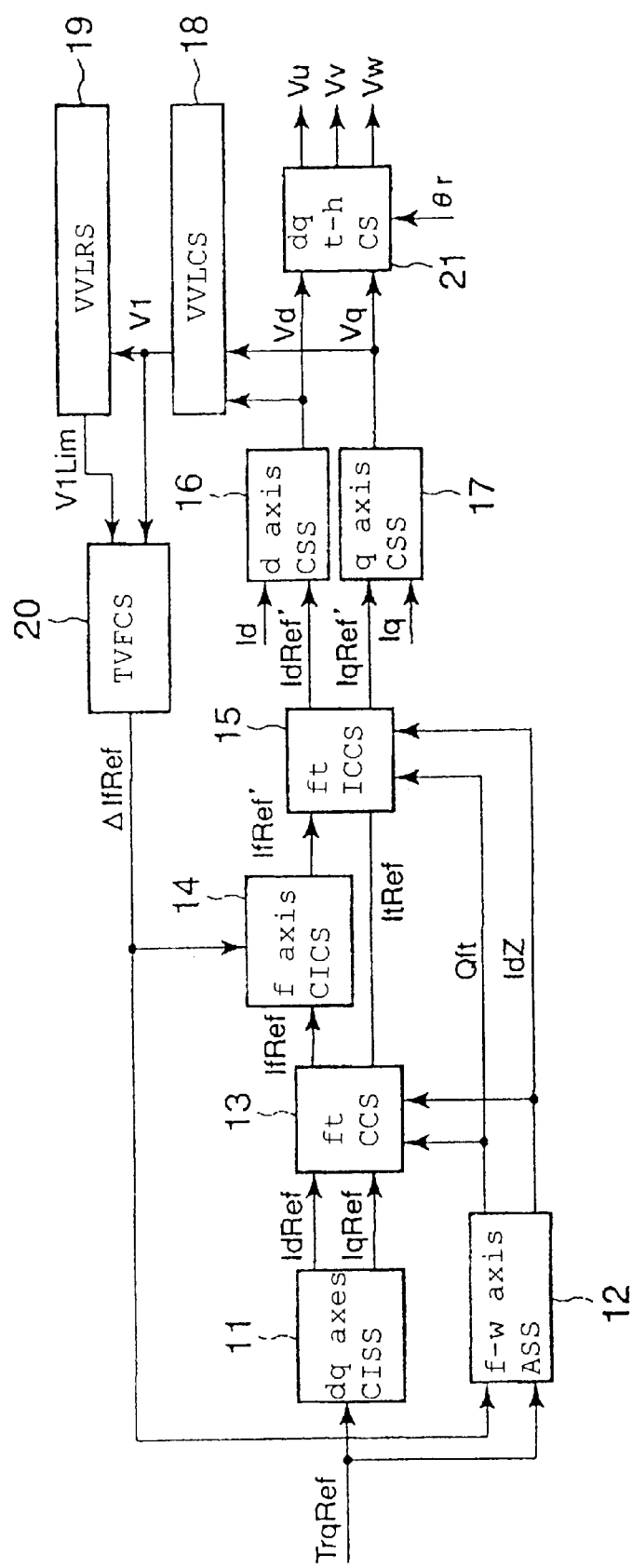
FIG. 1 is a functional block diagram of a motor control device according to a first embodiment of the present invention.

Referring now to the drawings, wherein like reference numerals designate identical or corresponding parts throughout the several views, and more particularly to FIG. 1 thereof, one embodiment of the present invention will be described.

(First Embodiment)

As shown in FIG. 1, the motor control device of this embodiment is applied, as the main circuitry thereof, to an inverter that drives a permanent magnet reluctance motor that generates a combined torque of the torque produced by a permanent magnet and reluctance torque and comprises a dq axes current instruction setting section (dq axes CISS) 11, flux-weakening axis angle setting section (f-w axis ASE) 12, ft co-ordinate conversion section (ft CCS) 13, f axis current instruction correction section (f axis CICS) 14, ft inverse co-ordinate conversion section (ft ICCS) 15, d axis current control section (d axis CCS) 16, q axis current control section (q axis CCS) 17, voltage vector length calculation section (VVLCS) 18, voltage vector length restriction section (VVLRS) 19, terminal voltage fixed control section (TVFCS) 20, and dq three-phase conversion section (dq t-h CS) 21.

The dq axes current instruction setting section 11 inputs a torque instruction TorqRef and finds and outputs the d axis current instruction IdRef and q axis current instruction IqRef which are most suitable for outputting this torque. The optimum values of IdRef and IqRef that are selected are for example the values for which the motor current vector length I1Ref necessary for outputting the same torque has the smallest value. The dq axes current instructions IdRef and IqRef at this point are found by the following procedure.

$$IdRef = \frac{-\Phi_{PM} + \sqrt{\Phi_{PM}^2 + 8 \cdot \Delta L^2 \cdot I1Ref^2}}{4 \cdot \Delta L}$$

$\Phi_{PM}$: permanent magnet flux, $\Delta L = Ld - Lq$, Ld: d axis inductance, Lq: q axis inductance, $I1Ref = \sqrt{IdRef^2 + IqRef^2}$: current amplitude.

Id and Iq that satisfy the above expression when the current amplitude I1 Ref is varied as a parameter are found and, in addition, the torque Trq which is then generated by the motor is found by the following expression.

$$Trq = p \cdot (\Phi_{PM} + \Delta L \cdot Id) \cdot Iq$$

(P: number of motor pole pairs)

Figure 2:
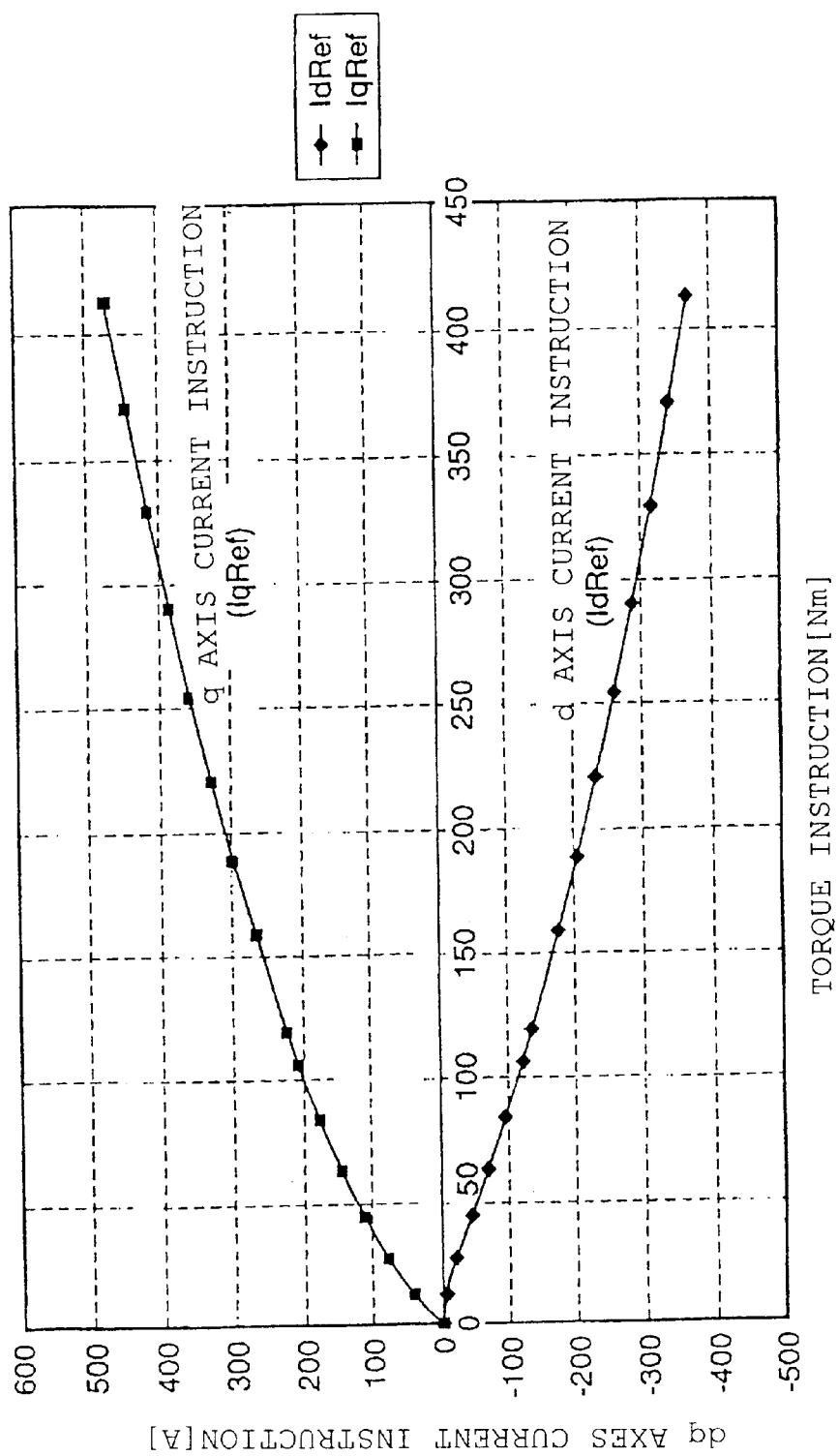
FIG. 2 is a view given in explanation of a set value of a dq axes current instruction setting section.

FIG. 2 shows the functional relationship of the dq axes current instructions IdRef and IqRef with the torque of a permanent magnet reluctance motor whose motor equivalent circuit constants are $\Phi_{PM} = 0.068$, Ld=0.18 mH, Lq=0.47 mH, number of pole pairs p=5. The d axis current instruction IdRef and q axis current instruction IqRef are found and output in accordance with the function graph of FIG. 2 from the torque instruction that is input.

Flux-weakening axis angle setting section 12 inputs a torque instruction TrqRef and the f axis current instruction correction value ΔIfRef output from terminal voltage constant control section 20 and finds and outputs the flux-weakening target point IdZ and flux-weakening angle optimum value Qft found beforehand experimentally or analytically in accordance with the torque instruction TrqRef and f axis current instruction correction value ΔIfRef by a method such as referring to a memory table, so as to be able to control flux-weakening along a line of equal torque corresponding to the torque instruction TrqRef that was input.

Figure 3:
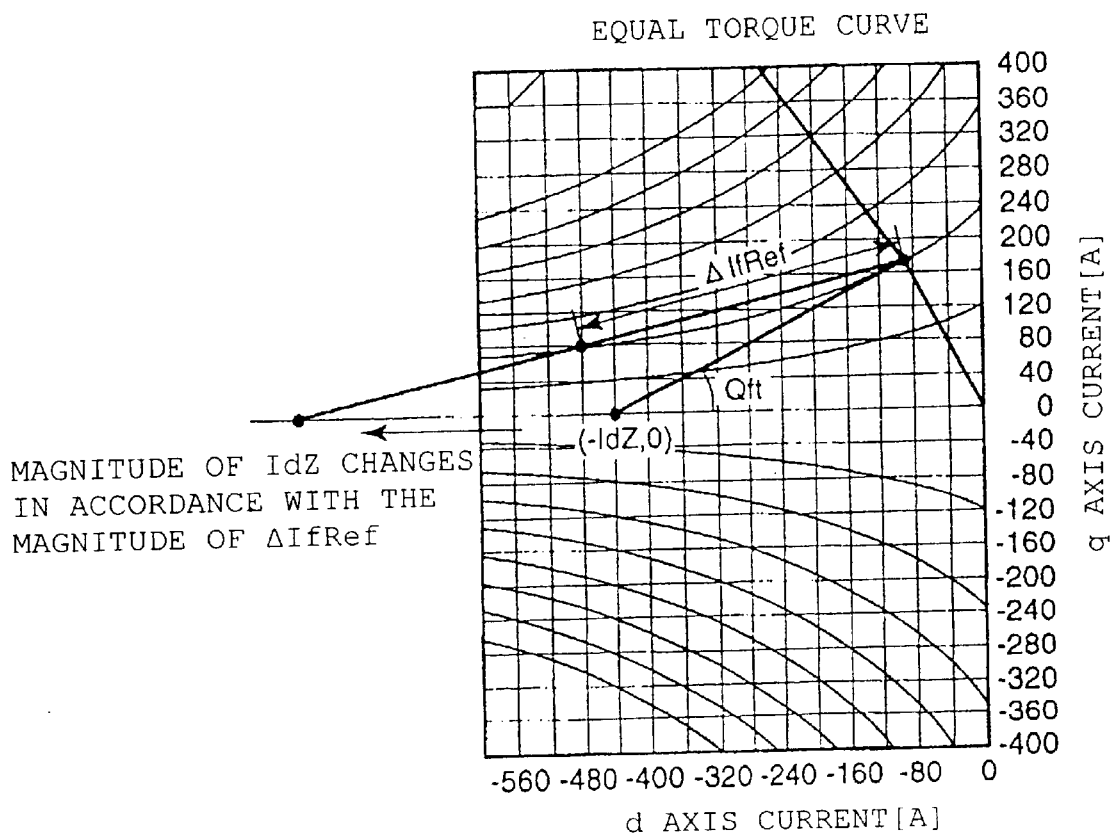
FIG. 3 is a view giving in explanation of the physical significance of the set value of a flux-weakening axis angle setting section.

As shown in FIG. 3, the physical significance of IdZ and Qft is that these are co-ordinates whereby the angle with respect to the d axis of the straight line indicating the direction of flux-weakening is Qft and the point of intersection with the d axis is indicated by (-IdZ, 0).

By making Qft and IdZ variable not merely with the torque instruction but also with the f axis current instruction correction value, flux-weakening control can be achieved following a curve of equal torque that varies in curvilinear fashion depending on the depth of flux-weakening represented by f axis current instruction correction value ΔIfRef.

ft co-ordinate conversion section 13 finds and outputs f axis current instruction IfRef and t axis current instruction ItRef by the following calculation, by inputting the d axis current instruction IdRef and the q axis current instruction IqRef that are output from the dq axes current instruction setting section and the flux-weakening axis angle Qft and flux-weakening target point IdZ that are output from flux-weakening axis angle setting section 12.

$$\begin{pmatrix} IfRef \\ ItRef \end{pmatrix} = \begin{pmatrix} \cos(Qft) & \sin(Qft) \\ -\sin(Qft) & \cos(Qft) \end{pmatrix} \begin{pmatrix} IdRef + IdZ \\ IqRef \end{pmatrix}$$

f axis current instruction correction section 14 finds and outputs a new f axis current instruction IfRef by inputting the f axis current instruction IfRef that is output from ft co-ordinate conversion section 13 and the f axis current instruction correction value ΔIfRef that is output from terminal voltage fixed control section 20, to be described.

$$IfRef' = IfRef + \Delta IfRef$$

ft inverse co-ordinate conversion section 15 finds and outputs new dq axes current instructions IdRef and IqRef by performing the following calculation, by inputting the f axis current instruction IfRef that is output from f axis current instruction correction section 14, the t axis current instruction ItRef that is output from ft co-ordinate conversion section 13 and the flux-weakening axis angle Qft and flux-weakening target point IdZ that are output from flux-weakening axis angle setting section 12.

$$\begin{pmatrix} IdRef' \\ IqRef' \end{pmatrix} = \begin{pmatrix} \cos(Qft) & -\sin(Qft) \\ \sin(Qft) & \cos(Qft) \end{pmatrix} \begin{pmatrix} IfRef' \\ ItRef \end{pmatrix} - \begin{pmatrix} IdZ \\ 0 \end{pmatrix}$$

d axis current control section 16 finds and outputs the d axis voltage instruction Vd such that Id tracks IdRef', by the following calculation, by inputting the d axis current instruction IdRef' that is output from ft inverse co-ordinate conversion section 15 and the d axis current feedback value Id obtained from the main circuit side.

$$Vd = (Kp + Ki/s) \times (IdRef' - Id)$$

(where s is the Laplace operator, Kp is the proportional gain and Ki is the integration gain)

q axis current control section 17 finds and outputs the q axis voltage instruction Vq such that Iq tracks IqRef', by the following calculation, by inputting dq axes current instruction IqRef' that is output from ft inverse co-ordinate conversion section 15 and the q axis current feedback value Iq that is obtained from the main circuit side.

$$Vq = (Kp + Ki/s) \times (IqRef' - Iq)$$

(where s is the Laplace operator, Kp is the proportional gain and Ki is the integration gain)

Voltage vector length calculating section 18 finds and outputs the voltage vector length V1, by the following calculation, by inputting the d axis voltage instruction Vd that is output from d axis current control section 16 and the q axis voltage instruction Vq that is output from q axis current control section 17.

$$V1 = \sqrt{Vd^2 + Vq^2}$$

Voltage vector length restriction section 19 finds and outputs the voltage vector length V1Lim, by the following calculation, by inputting the voltage vector length V1 that is output from voltage vector length calculating section 18 and the inverter input DC voltage Vdc (not shown).

Initially, the maximum voltage V1Max is found by the following calculation.

$$V1Max = \frac{\sqrt{6}}{\pi} \cdot Vdc \times 0.9$$

(The above expression expresses the fundamental wave voltage amplitude in single-pulse mode; 0.9 is a coefficient for setting at a value obtained by subtracting 10%, in order to provide a control margin)

(1) If the terminal voltage V1 is smaller than V1Max, V1Lim=V1

(2) If the terminal voltage V1 is larger than V1Max, V1Lim=V1Max

Terminal voltage fixed control section 20 finds and outputs the f axis current instruction correction value ΔIfRef, by the following calculation, by inputting the voltage vector length V1 output from voltage vector length calculating section 18 and the voltage vector length V1Lim that is output from voltage vector length restriction section 19.

$$\Delta IfRef = G(s) \cdot (V1Lim - V1)$$

(where s is the Laplace operator, Kp is the proportional gain and Ki is the integration gain)

dq three-phase conversion section 21 finds and outputs the UVW three-phase voltage instructions for Vu, Vv and Vw, by the following calculation, by inputting the d axis voltage instruction Vd that is output from d axis current control section 16, the q axis voltage instruction Vq that is output from q axis current control section 17, and the motor rotor phase Or that is obtained by a sensor or the like attached to a permanent magnet reluctance motor, not shown.

$$V1 = \sqrt{Vd^2 + Vq^2}$$

$$\delta V = \tan^{-1}\left(\frac{Vq}{Vd}\right)$$

$$Vu = \sqrt{\frac{2}{3}} \cdot V1 \cdot \cos(\theta + \delta V)$$

$$Vv = \sqrt{\frac{2}{3}} \cdot V1 \cdot \cos\left(\theta + \delta V - \frac{2}{3}\pi\right)$$

$$Vw = \sqrt{\frac{2}{3}} \cdot V1 \cdot \cos\left(\theta + \delta V - \frac{4}{3}\pi\right)$$

With the motor control device of the present embodiment constructed as above, it becomes possible to make Qft and IdZ variable not merely, as conventionally, with the torque instruction but also with the f axis current instruction correction value, thanks to the adoption of a construction wherein flux-weakening axis angle setting section 12 is constituted as a memory table whereby the flux-weakening angle optimum value Qft and flux-weakening target point IdZ, which are found beforehand experimentally or analytically, can be referenced using the torque instruction TrqRef and f axis current instruction correction value ΔIfRef. Thus flux-weakening control can be achieved following a curve of the equal torque that changes in curvilinear fashion in accordance with the depth of flux-weakening expressed by f axis current instruction correction value ΔIfRef.

In this way, by taking into account not merely the torque instruction but also the magnitude of the flux-weakening current, variable setting of the direction of the current flowing for flux-weakening control purposes can be achieved; in this way, irrespective of the torque output conditions, torque is output that tracks closely the torque instruction and flux-weakening control can be performed in a stable and effective fashion.

(Second Embodiment)

Figure 4:
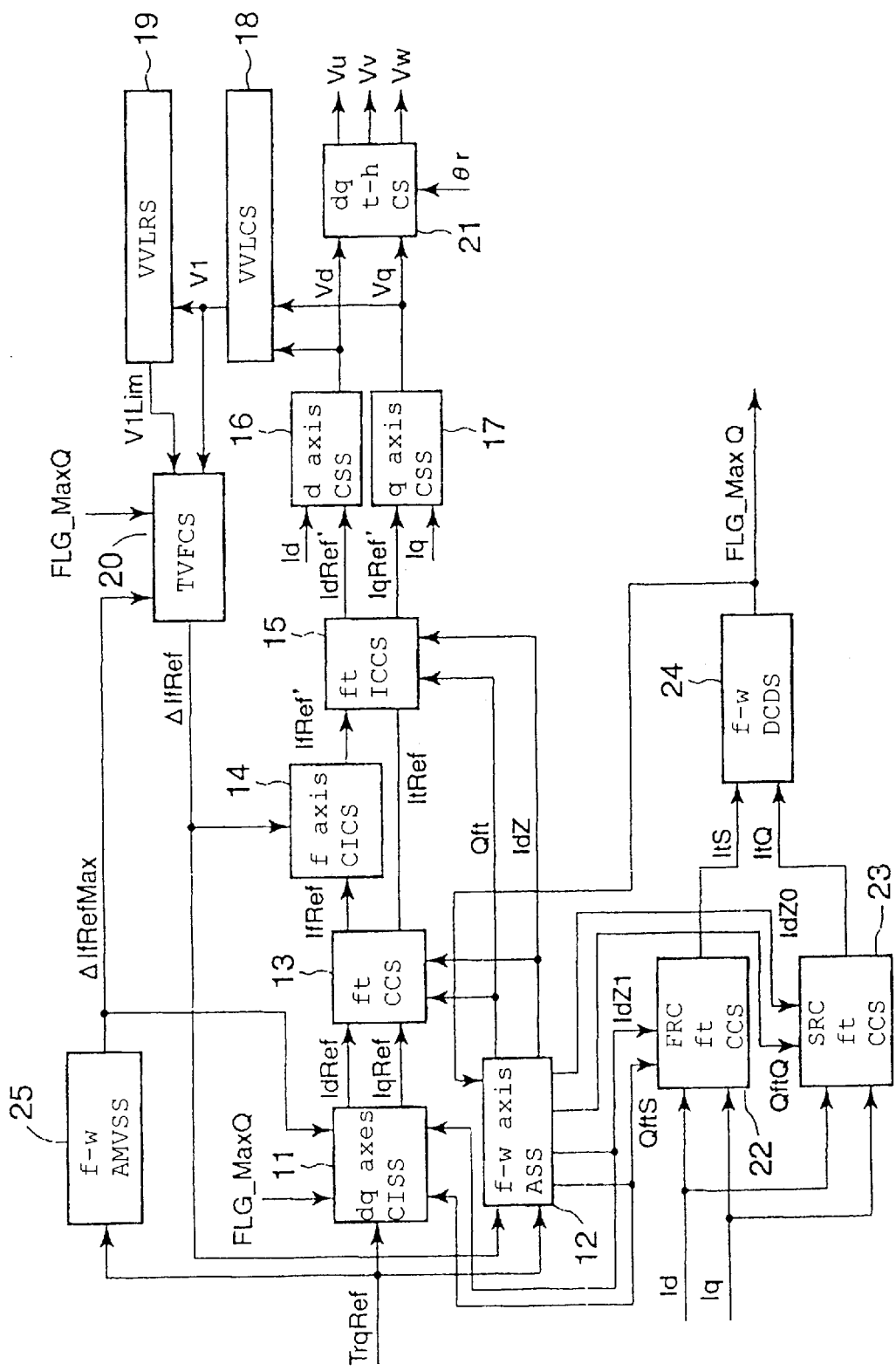
FIG. 4 is a functional block diagram of a motor control device according to a second embodiment.

As shown in FIG. 4, the motor control device of the present embodiment is applied, as the main circuitry thereof, in the same way as in the case of the previous embodiment, to an inverter that drives a permanent magnet reluctance motor that generates a combined torque of the torque produced by a permanent magnet and reluctance torque and comprises a dq axes current instruction setting section (dq axes CISS) 11, flux-weakening axis angle setting section (f-w axis ASS) 12, ft co-ordinate conversion section (ft CCS) 13, f axis current instruction correction section (f axis CICS) 14, ft inverse co-ordinate conversion section (ft ICCS) 15, d axis current control section (d axis CCS) 16, q axis current control section (q axis CCS) 17, voltage vector length calculation section (VVLCS) 18, voltage vector length restriction section (VVLRS) 19, terminal voltage fixed control section (TVFCS) 20, dq three-phase conversion section (dq t-p CS) 21, first real current ft co-ordinate conversion section (FRC ft CCS) 22, second real current ft co-ordinate conversion section (SRC ft CCS) 23, flux-weakening direction changeover decision section (f-w DCDS) 24 and flux-weakening amount maximum value setting section (f-w AMVSS) 25.

ft co-ordinate conversion section 13, f axis current instruction correction section 14, ft inverse co-ordinate conversion section 15, d axis current control section 16, q axis current control section 17, voltage vector length calculation section 18, voltage vector length restriction section 19 and dq three-phase conversion section 21 perform the same operation as in the case of the first embodiment.

dq axes current instruction setting section 11 finds and outputs the dq axes current instructions IdRef and IqRef by the following setting it calculation in accordance with the value of FLG_MaxQ, by inputting torque instruction TorqRef, the flux-weakening amount maximum value ΔIfRefMax that is output from flux-weakening amount maximum value setting section 25, flux-weakening direction changeover flag FLG_MaxQ that is output from flux-weakening direction changeover decision section 24, first flux-weakening target point IdZ1 and first flux-weakening angle QftS that are output from flux-weakening axis angle setting section 12.

(1) When FLG_MaxQ=0

In the same way as in the case of the first embodiment, the d axis current instruction IdRef and q axis current instruction IqRef that are most suitable for outputting torque in accordance with the torque instruction are found and output. The method of calculation of IdRef and IqRef is the same as in the case of the first embodiment.

(1) When FLG_MaxQ=1

First of all, the dq axes current instructions when FLG_MaxQ=0 are found as IdRefS and IqRefS. New dq axes current instructions in regard to these are then found by the following calculation, using ΔIfRefMax and ΔIdZ1 and QftS.

First of all, the ft axis current instructions IfRef and ItRef are found.

$$\begin{pmatrix} IfRef \\ ItRef \end{pmatrix} = \begin{pmatrix} \cos(QftS) & \sin(QftS) \\ -\sin(QftS) & \cos(QftS) \end{pmatrix} \begin{pmatrix} IdRefS + IdZ1 \\ IqRefS \end{pmatrix}$$

the new dq axis current instructions are found using the above ft axis current instructions.

$$\begin{pmatrix} IdRef' \\ IqRef' \end{pmatrix} = \begin{pmatrix} \cos(Qft) & -\sin(Qft) \\ \sin(Qft) & \cos(Qft) \end{pmatrix} \begin{pmatrix} IfRef' \\ ItRef \end{pmatrix} - \begin{pmatrix} IdZ \\ 0 \end{pmatrix}$$

By the above calculation, the co-ordinates of the point of intersection of the first line of the direction of flux-weakening and the second line of the direction of flux-weakening is found as the new dq axes current instruction.

Flux-weakening axis angle setting section 12 finds and outputs in accordance with the condition of FLG_MaxQ the first flux-weakening angle QftS, second flux-weakening angle QftQ and third flux-weakening angle Qft and first flux-weakening target point IdZ1, second flux-weakening target point IdZ0 and third flux-weakening target point IdZ, by inputting the torque instruction TrqRef, the f axis current correction value ΔIfRef that is output from terminal voltage fixed control section 20, and the flux-weakening direction changeover flag FLG_MaxQ that is output from the flux-weakening direction changeover decision section.

(1) QftS and IdZ1 are respectively the same as the flux-weakening angles Qft and IdZ in the first embodiment.

(2) QftQ and IdZ0 are set to values that define the second direction of flux-weakening.

Figure 5:
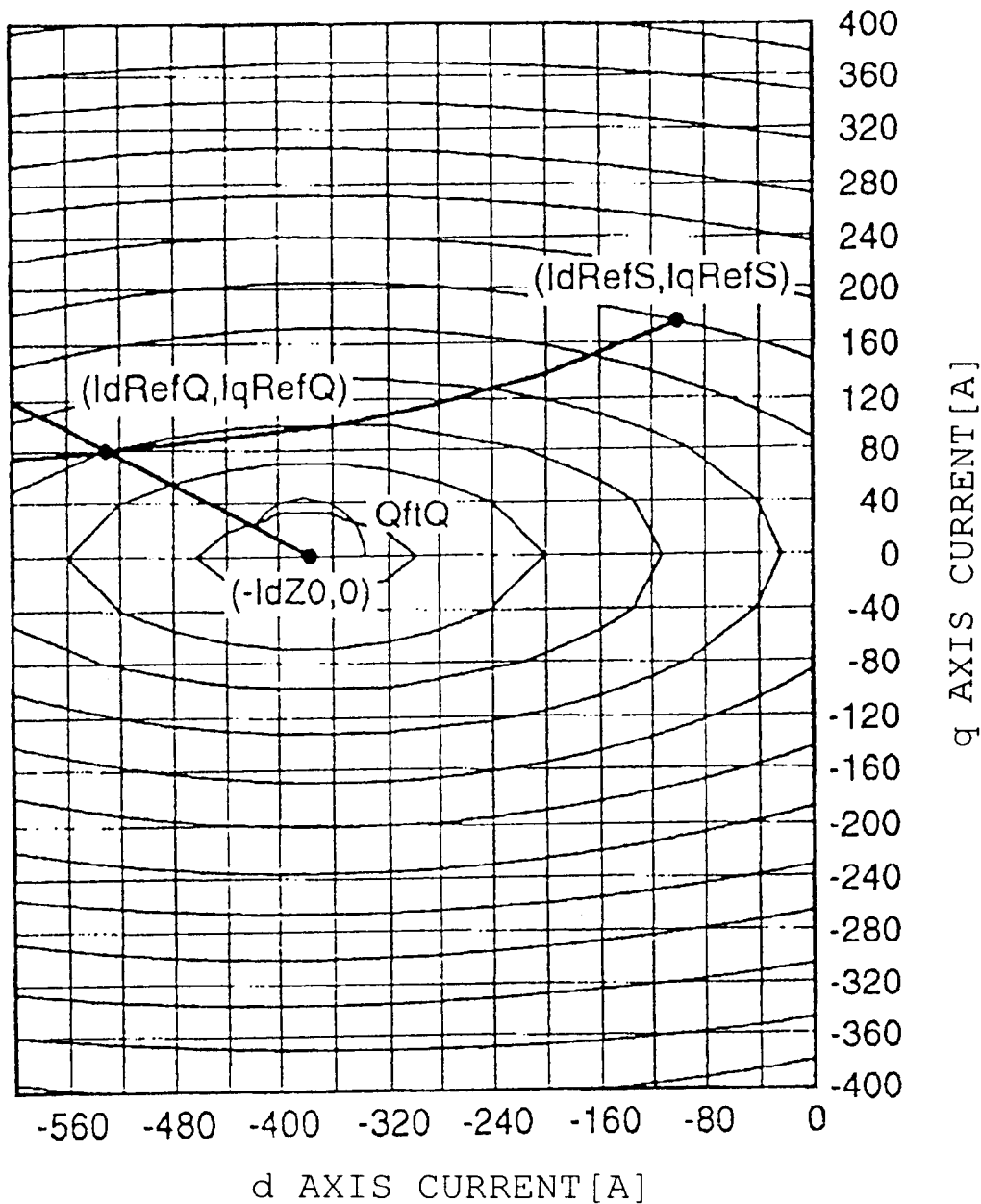
FIG. 5 is a view given in explanation of the setting of a second direction of flux-weakening in the second embodiment.

As the second flux-weakening direction, for example as shown in FIG. 5, a direction of linear approximation of the point where maximum torque is obtained on an equipotential ellipse is set, taking the center of the equipotential ellipse as the target point.

If flux-weakening control is performed along the line of the first flux-weakening direction, just as described with reference the first embodiment, flux-weakening control can be performed in which the motor terminal voltage is reduced while maintaining an equal-torque characteristic practically tracking the torque instruction; however, if flux-weakening control is performed beyond the intersection with the line of the second flux-weakening direction that was set as described above further along the line of the first flux-weakening direction, contrariwise, the motor terminal voltage rises, making it impossible to perform effective flux-weakening control and a condition in which control is impossible is produced. The following measures are therefore adopted.

(3) The output of Qft and IdZ is set as follows in accordance with the condition of FLG_MaxQ.

When FLG_MaxQ=1, Qft=QftQ and IdZ=IdZ0

When FLG_MaxQ=0, Qft=QftS and IdZ=IdZ1

Terminal voltage fixed control section 20 finds and outputs the current instruction correction value ΔI1Ref by the following calculation, by inputting the voltage vector length V1 that is output from voltage vector length calculating section 18, the voltage vector length V1Lim that is output from voltage vector length restriction section 19, the flux-weakening amount maximum value ΔIfRefMax that is output from the flux-weakening amount maximum value setting section 25 and the flux-weakening direction changeover flag FLG_MaxQ that is output from flux-weakening direction changeover decision section 24.

(1) When FLG_MaxQ=0,

ΔIfRef=G(s)·(V1Lim−V1)

(where s is the Laplace operator, G(s) is the control gain) Proportional/integral control of G(s) is envisaged.

(2) When FLG_MaxQ=1,

ΔIfRef=G(s)·(V1Lim−V1)−ΔIfRefMax

First real current ft co-ordinate conversion section 22 finds and outputs first t axis current ItS by the following calculation, by inputting dq axes current feedback values Id, Iq obtained from the main circuit side, and first flux-weakening angle QftS and first flux-weakening target point IdZ1 output from flux-weakening axis angle setting section 12.

$$\begin{pmatrix} IfS \\ ItS \end{pmatrix} = \begin{pmatrix} \cos(QftS) & \sin(QftS) \\ -\sin(QftS) & \cos(QftS) \end{pmatrix} \begin{pmatrix} Id + IdZ1 \\ Iq \end{pmatrix}$$

Second real current ft co-ordinate conversion section 23 finds and outputs second t axis current ItQ by the following calculation, by inputting dq axes current feedback values Id, Iq obtained from the main circuit side, and second flux-weakening angle QftQ and second flux-weakening target point IdZ0 output from flux-weakening axis angle setting section 12.

$$\begin{pmatrix} IfQ \\ ItQ \end{pmatrix} = \begin{pmatrix} \cos(QftQ) & \sin(QftQ) \\ -\sin(QftQ) & \cos(QftQ) \end{pmatrix} \begin{pmatrix} Id + IdZ0 \\ Iq \end{pmatrix}$$

Flux-weakening direction changeover decision section 24 finds and outputs flux-weakening direction changeover flag FLG_MaxQ by the following condition branching by inputting the first t axis current ItS that is output from first real current ft co-ordinate conversion section 22 and the second t axis current ItQ that is output from the second real current ft co-ordinate conversion section 23.

(1) If ItS>0, FLG_MaxQ=0
(2) If ItS<0,
    If ItQ>0, FLG_MaxQ=1
    If ItQ<0, FLG_MaxQ is unchanged (the previous value is held).

FLG_MaxQ=0 indicates that the mode is the mode in which flux-weakening control is performed along the line of the first flux-weakening direction. FLG_MaxQ=1 indicates that the mode is the mode in which flux-weakening control is performed along the line of the second flux-weakening direction.

If condition branching is performed as described above, when FLG_MaxQ=0, flux-weakening control is performed along the line of the first flux-weakening direction; if the point where further flux-weakening control in this direction cannot be performed (IdRefQ, IqRefQ) is passed, ItQ becomes positive and FLG_MaxQ becomes 1. As a result, the direction of flux-weakening becomes the second flux-weakening direction, so that flux-weakening control can be continued in stable fashion.

In a condition in which FLG_MaxQ=1 and flux-weakening control is being performed along the line of the second flux-weakening direction, mode changeover can be performed in the same way even in the case of straddling of the point of intersection with the line of the first flux-weakening direction, flux-weakening control becoming unnecessary.

Using the dq axes current instructions (IdRefS and IqRefS) that are set by dq axes current instruction setting section 11 and the current values corresponding to the vector lengths of (IdRefQ and IqRefQ) which are found beforehand, flux-weakening amount maximum value setting section 25 inputs torque instruction TrqRef and outputs these by a method such as memory table look-up.

With a motor control device according to the present embodiment constructed as above, under operating conditions wherein flux-weakening control can be performed while maintaining an equal-torque characteristic, an equal-torque characteristic is maintained; under operating conditions wherein flux-weakening control can no longer be performed while maintaining an equal-torque characteristic, stable flux-weakening control can be performed without creating control abnormalities.

(Third Embodiment)

Figure 6:
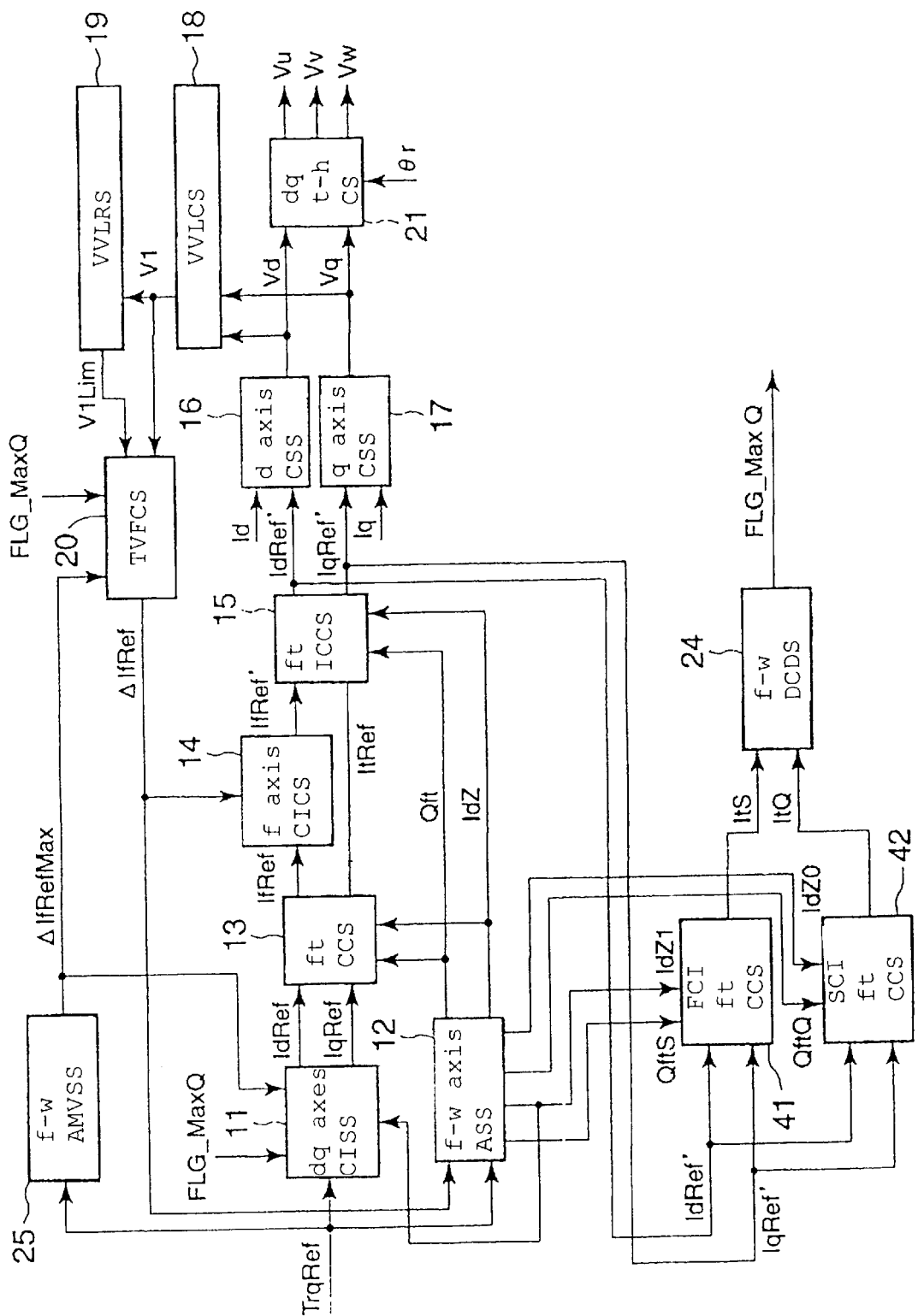
FIG. 6 is a functional block diagram given in explanation of the construction of a motor control device according to a third embodiment.

As shown in FIG. 6, the motor control device of the present embodiment is applied, as the main circuitry (circuit) thereof, in the same way as in the case of the previous embodiment, to an inverter that drives a permanent magnet reluctance motor that generates a combined torque of the torque produced by a permanent magnet and reluctance torque and comprises a dq axes current instruction setting section 11, flux-weakening axis angle setting section 12, ft co-ordinate conversion section 13, f axis current instruction correction section 14, ft inverse co-ordinate conversion section 15, d axis current control section 16, q axis current control section 17, voltage vector length calculation section 18, voltage vector length restriction section 19, terminal voltage fixed control section 20, dq three-phase conversion section 21, first current instruction ft co-ordinate conversion section (FCI ft CCS) 41, second current instruction ft co-ordinate conversion section (SCI ft CCS) 42, flux-weakening direction changeover decision section 24 and flux-weakening amount maximum value setting section 25.

The operation of dq axes current instruction setting section 11, flux-weakening axis angle setting section 12, ft co-ordinate conversion section 13, f axis current instruction correction section 14, ft inverse co-ordinate conversion section 15, d axis current control section 16, q axis current control section 17, voltage vector length calculation section 18, voltage vector length restriction section 19, terminal voltage fixed control section 20, dq three-phase conversion section 21, flux-weakening direction changeover decision section 24 and flux-weakening amount maximum value setting section 25 is the same as in the case of the second embodiment.

First current instruction ft co-ordinate conversion section 41 finds and outputs first t axis current ItS by the following calculation by inputting the dq axes current instruction values IdRef' and IqRef' that are output from ft inverse co-ordinate conversion section 15 and first flux-weakening angle QftS and first flux-weakening target point IdZ1 output from flux-weakening axis angle setting section 12.

$$\begin{pmatrix} IfS \\ ItS \end{pmatrix} = \begin{pmatrix} \cos(QftS) & \sin(QftS) \\ -\sin(QftS) & \cos(QftS) \end{pmatrix} \begin{pmatrix} IdRef' + IdZ1 \\ IqRef' \end{pmatrix}$$

Second current instruction ft co-ordinate conversion section 42 finds and outputs second t axis current ItQ by the following calculation by inputting the dq axes current instruction values IdRef' and IqRef' that are output from ft inverse co-ordinate conversion section 15 and second flux-weakening angle QftQ and second flux-weakening target point IdZ0 output from flux-weakening axis angle setting section 12.

$$\begin{pmatrix} IfQ \\ ItQ \end{pmatrix} = \begin{pmatrix} \cos(QftQ) & \sin(QftQ) \\ -\sin(QftQ) & \cos(QftQ) \end{pmatrix} \begin{pmatrix} IdRef' + IdZ0 \\ IqRef' \end{pmatrix}$$

Using a motor control device constructed as above, in the same way as in the second embodiment, under operating conditions wherein flux-weakening control can be performed while maintaining an equal-torque characteristic, an equal-torque characteristic is maintained; under operating conditions wherein flux-weakening control can no longer be performed while maintaining an equal-torque characteristic, stable flux-weakening control can be performed without creating control abnormalities.

In particular, in changeover of control mode, for changeover can be performed in a reliable fashion without being affected by the current control characteristic and/or external disturbances such as current ripple.

(Fourth Embodiment)

Figure 7:
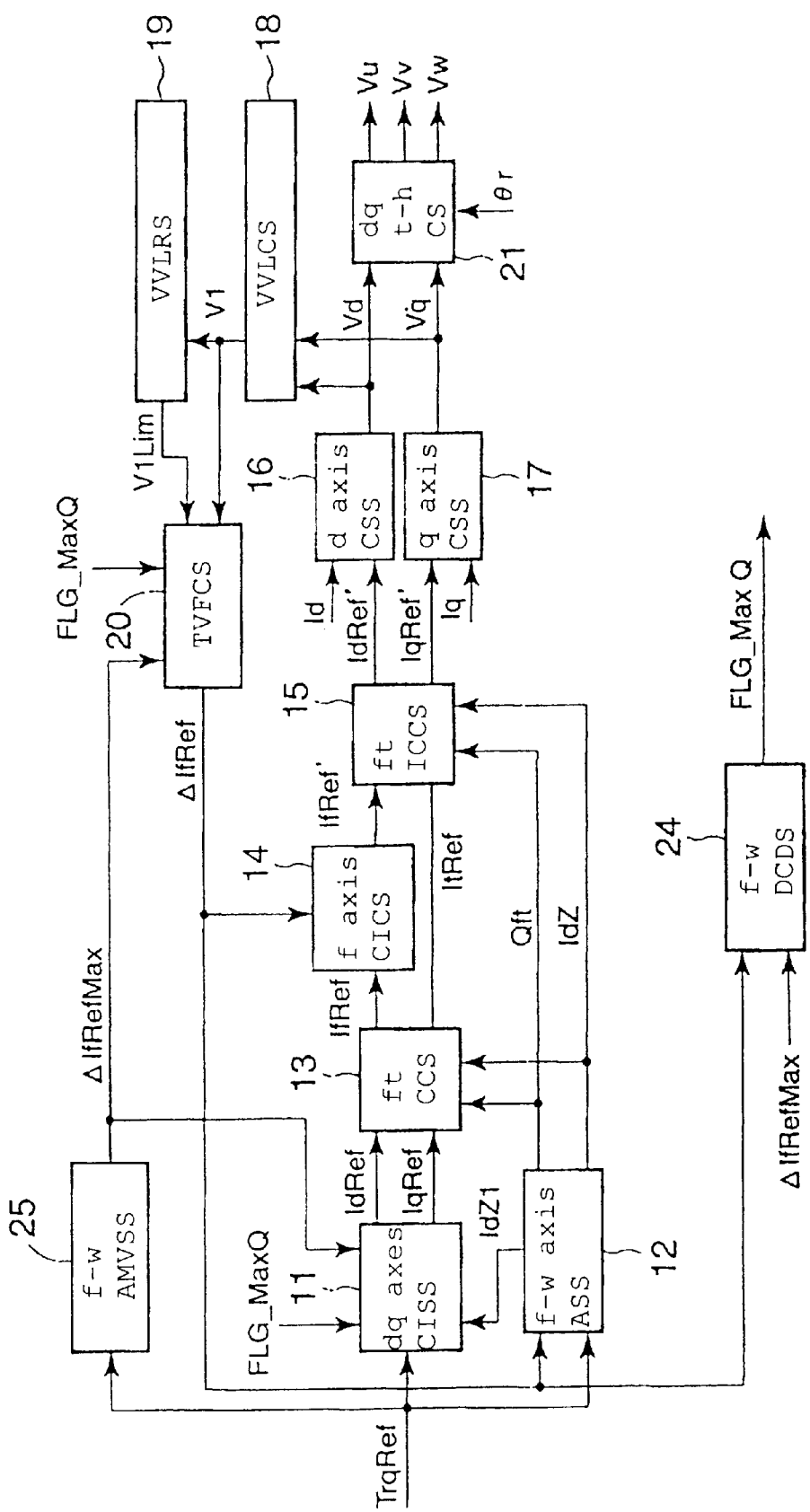
FIG. 7 is a functional block diagram given in explanation of the construction of a motor control device according to a fourth embodiment.

As shown in FIG. 7, the motor control device of the present embodiment is applied, as the main circuitry thereof, in the same way as in the case of the previous embodiment, to an inverter that drives a permanent magnet reluctance motor that generates a combined torque of the torque produced by a permanent magnet and reluctance torque and comprises a dq axes current instruction setting section 11, flux-weakening axis angle setting section 12, ft co-ordinate conversion section 13, f axis current instruction correction section 14, ft inverse co-ordinate conversion section 15, d axis current control section 16, q axis current control section 17, voltage vector length calculation section 18, voltage vector length restriction section 19, terminal voltage fixed control section 20, dq three-phase conversion section 21, flux-weakening direction changeover decision section 24 and flux-weakening amount maximum value setting section 25.

The operation of dq axes current instruction setting section 11, flux-weakening axis angle setting section 12, ft co-ordinate conversion section 13, f axis current instruction correction section 14, ft inverse co-ordinate conversion section 15, d axis current control section 16, q axis current control section 17, voltage vector length calculation section 18, voltage vector length restriction section 19, terminal voltage fixed control section 20, dq three-phase conversion section 21 and flux-weakening amount maximum value setting section 25 is the same as in the case of the second embodiment.

Flux-weakening direction changeover decision section 24 finds and outputs flux-weakening direction changeover flag FLG_MaxQ by the following condition decision by inputting the f axis current correction value ΔIfRef that is output from terminal voltage fixed control section 20 and the flux-weakening amount maximum value ΔIfRefMax that is output from the flux-weakening amount maximum value setting section 25.

(1) If ΔIfRef>ΔIfRefMax, FLG_MaxQ=1
(2) If ΔIfRef<ΔIfRefMax, FLG_MaxQ=0

Using a motor control device constructed as above, in the same way as in the second embodiment, under operating conditions wherein flux-weakening control can be performed while maintaining an equal-torque characteristic, an equal-torque characteristic is maintained; under operating conditions wherein flux-weakening control can no longer be performed while maintaining an equal-torque characteristic, stable flux-weakening control can be performed without creating control abnormalities.

(Fifth Embodiment)

Figure 8:
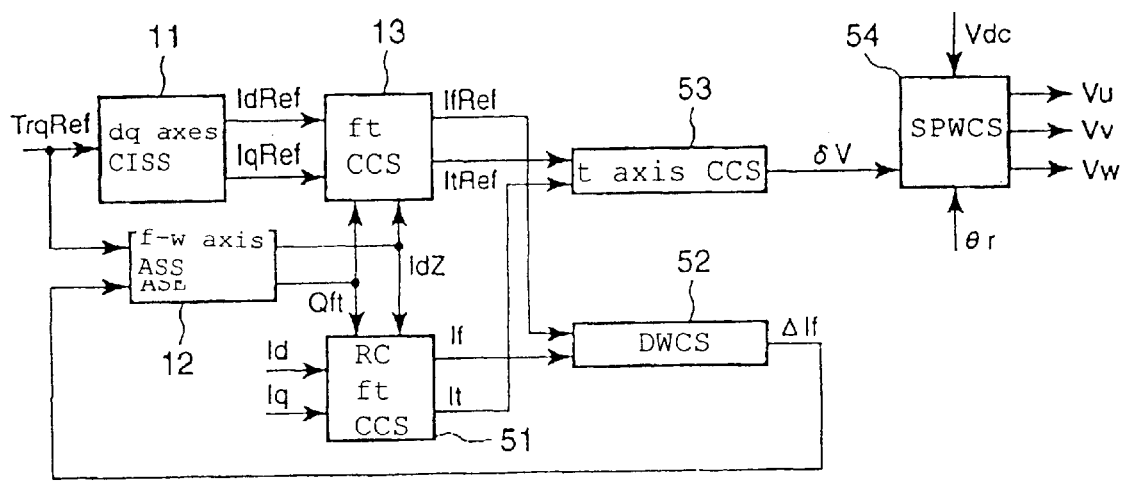
FIG. 8 is a functional block diagram given in explanation of the construction of a motor control device according to a fifth embodiment.
Figure 9:
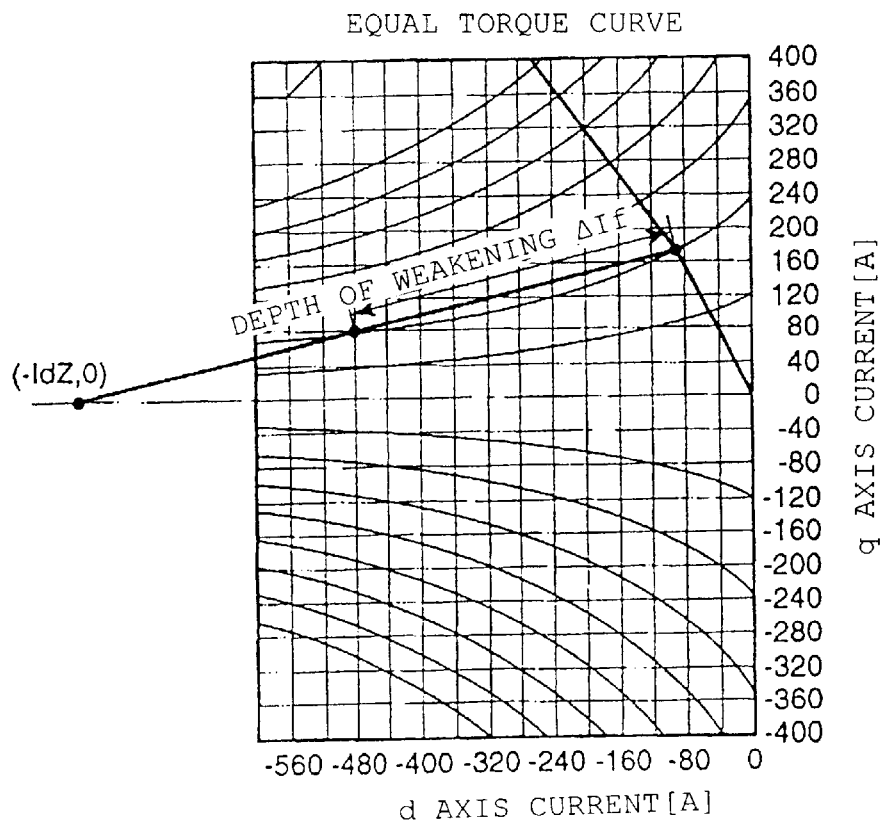
FIG. 9 is a view given in explanation of the depth of weakening in the fifth embodiment.

As shown in FIG. 8 to FIG. 9, the motor control device of the present embodiment is applied, as the main circuitry thereof, in the same way as in the case of the previous embodiment, to an inverter that drives a permanent magnet reluctance motor that generates a combined torque of the torque produced by a permanent magnet and reluctance torque and comprises a dq axes current instruction setting section 11, flux-weakening axis angle setting section 12, ft co-ordinate conversion section 13, real current ft co-ordinate conversion section (RC ft CCS) 51, depth of weakening calculation section (DWCS) 52, t axis current control section (t axis CCS) 53 and single pulse waveform calculation section (SPWCS) 54.

The operation of dq axes current instruction setting section 11 and ft co-ordinate conversion section 13 is the same as in the case of the first embodiment.

Flux-weakening axis angle setting section 12 inputs a torque instruction TrqRef and depth of weakening ΔIf output from depth of weakening calculating section 52 and finds and outputs the flux-weakening target point IdZ and flux-weakening angle optimum value Qft found beforehand experimentally or analytically in accordance with the torque instruction TrqRef and depth of weakening ΔIf by a method such as referring to a memory table, so as to be able to control flux-weakening along a line of equal torque corresponding to the torque instruction TrqRef that was input.

The physical significance of IdZ and Qft is as shown in FIG. 9. These are co-ordinates whereby the angle with respect to the d axis of the straight line indicating the direction of flux-weakening is Qft and the point of intersection with the d axis is indicated by (−IdZ, 0).

By making Qft and IdZ variable not merely with the torque instruction but also with the depth of weakening ΔIf, flux-weakening control can be achieved following a curve of equal torque that varies in curvilinear fashion depending on the depth of flux-weakening.

Depth of weakening calculation section 52 finds and outputs the depth of weakening ΔIf by the following calculation, by inputting the f axis current instruction If Ref that is output from ft co-ordinate conversion section 13 and the f axis current If that is output from real current ft co-ordinate conversion section 51.

$$\Delta If = IfRef - If$$

t axis current control section 53 finds and outputs the voltage phase angle δV by the following calculation, by inputting the t axis current instruction ItRef that is output from ft co-ordinate conversion section 13 and the t axis current It that is output from real current ft co-ordinate conversion section 51.

$$\delta V = G(s) \times (ItRef - It)$$

(where s is the differential operator, G (s) is the control gain, and proportional integral control is envisaged)

single pulse waveform calculating section 54 finds and outputs the three-phase single pulse waveforms Vu, Vv and Vw by the following calculation, by inputting the voltage phase angle δV that is output from t axis current control section 53, the motor rotor phase θr and the inverter input DC voltage Vdc.

First of all, the three-phase voltage sine waves Vu0, Vv0 and Vw0 are found by the following expressions.

$$Vu0 = \cos(\theta r + \delta V)$$

$$Vv0 = \cos\left(\theta r + \delta V - \frac{2\pi}{3}\right)$$

$$Vw0 = \cos\left(\theta r + \delta V - \frac{4\pi}{3}\right)$$

Vu, Vv and Vw are respectively found by the following condition branching.

When $Vu0>0, Vu=+Vdc/2$, when $Vu0<0, Vu=-Vdc/2$

When $Vv0>0, Vv=+Vdc/2$, when $Vv0<0, Vv=-Vdc/2$

When $Vw0>0, Vw=+Vdc/2$, when $Vw0<0, Vw=-Vdc/2$

With a motor control device constructed as above, just as in the first embodiment, irrespective of the torque output conditions, flux-weakening control can be performed with a torque output that tracks closely the torque instruction. In addition, the inverter voltage utilization factor (rate) can be increased, device costs lowered and efficiency improved by applying a single pulse waveform.

(Sixth Embodiment)

Figure 10:
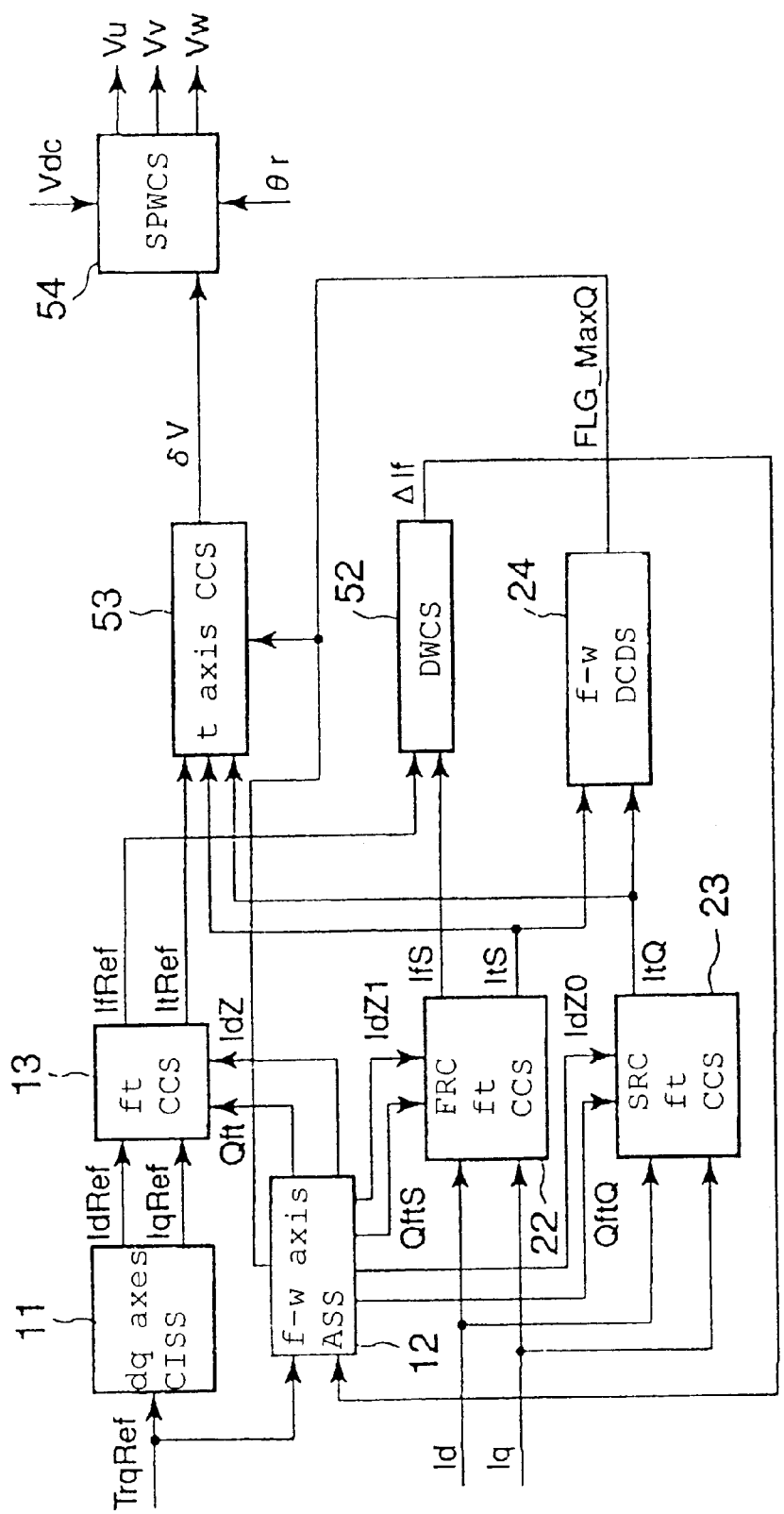
FIG. 10 is a functional block diagram given in explanation of the construction of a motor control device according to a sixth embodiment.

As shown in FIG. 10, the motor control device of the present embodiment is applied, as the main circuitry thereof, in the same way as in the case of the previous embodiment, to an inverter that drives a permanent magnet reluctance motor that generates a combined torque of the torque produced by a permanent magnet and reluctance torque and comprises a dq axes current instruction setting section 11, flux-weakening axis angle setting section 12, ft co-ordinate conversion section 13, first real current ft co-ordinate conversion section 22, second real current ft co-ordinate conversion section 23, flux-weakening direction changeover decision section 24, depth of weakening calculation section 52, t axis current control section 53 and single pulse waveform calculation section 54.

The operation of dq axes current instruction setting section 11, ft co-ordinate conversion section 13, depth of weakening calculation section 52 and single pulse waveform calculation section 54 is the same as in the case of the fifth embodiment.

The operation of first real current ft co-ordinate conversion section 22, second real current ft co-ordinate conversion section 23 and flux-weakening direction changeover decision section 24 is the same as in the case of the second embodiment.

Flux-weakening axis angle setting section 12 inputs a torque instruction TrqRef, depth of weakening ΔIf output from depth of weakening calculating section 52 and flux-weakening direction changeover flag FLG_MaxQ that is output from flux-weakening direction changeover decision section 24 and finds and outputs first flux-weakening target point IdZ1, second flux-weakening target point IdZ0 and third flux-weakening target point IdZ and first flux-weakening angle QftS, second flux-weakening angle QftQ and third flux-weakening angle Qft in accordance with the condition of FLG_MaxQ.

The difference with respect to the flux-weakening axis angle setting section 12 in the second embodiment lies in the fact that the various calculations are performed by inputting DATA If instead of the input ΔIfRef in the second embodiment.

(1) QftS and IdZ1 are respectively the same as the flux-weakening angle Qft and IdZ in the fifth embodiment.

(2) QftQ and IdZ0 are set at values that define the second flux-weakening direction.

As the second flux-weakening direction, just as in the case of the second embodiment, for example as shown in FIG. 5, a direction is set that linearly approximates the point where maximum torque is obtained on an equipotential ellipse, the center of the equipotential ellipse being the target point.

If flux-weakening control is performed along the line of the first flux-weakening direction, just as described with reference to the first embodiment, flux-weakening control can be performed wherein the motor terminal voltage is reduced while maintaining an equal torque characteristic practically tracking the torque instruction, but if flux-weakening control is performed further along the line of the first flux-weakening direction beyond the intersection with the line of the second flux-weakening direction that was set as described above, contrariwise, the motor terminal voltage rises, making effective flux-weakening control impossible, with the result that a condition in which control is impossible is produced.

(3) Qft and IdZ are set are as follows in accordance with the condition of FLG_MaxQ.

When FLG_MaxQ=1, Qft=QftQ and IdZ=IdZ0

When FLG_MaxQ=0, Qft=QftS and IdZ=IdZ1

T axis current control section 53 finds and outputs the voltage and phase angle δV by the following calculation, by inputting the t axis current instruction ItRef that is output from ft co-ordinate conversion section 13, first t axis current ItS that is output from real current ft co-ordinate conversion section 22, second t axis current ItQ that is output from real current ft co-ordinate conversion section 23 and flux-weakening direction changeover flag FLG_MaxQ that is output from flux-weakening direction changeover decision section 24.

(1) When $FLG\_{MaxQ}=1$, $\delta V=G(s)\times(ItRef-ItQ)$ (2) When $FLG\_{MaxQ}=0$, $\delta V=G(s)\times(ItRef-ItS)$ (where s is the Laplace operator, G (s) is the control gain, and proportional integral control is envisaged)

Using a motor control device constructed as above, under operating conditions wherein flux-weakening control can be performed while maintaining an equal-torque characteristic, an equal-torque characteristic is maintained; under operating conditions wherein flux-weakening control can no longer be performed while maintaining an equal-torque characteristic, stable flux-weakening control can be performed without creating control abnormalities.

In addition, the inverter voltage utilization factor can be increased, device costs lowered and improvement in efficiency can be achieved in combination by applying a single pulse waveform.

(Seventh Embodiment)

Figure 11:
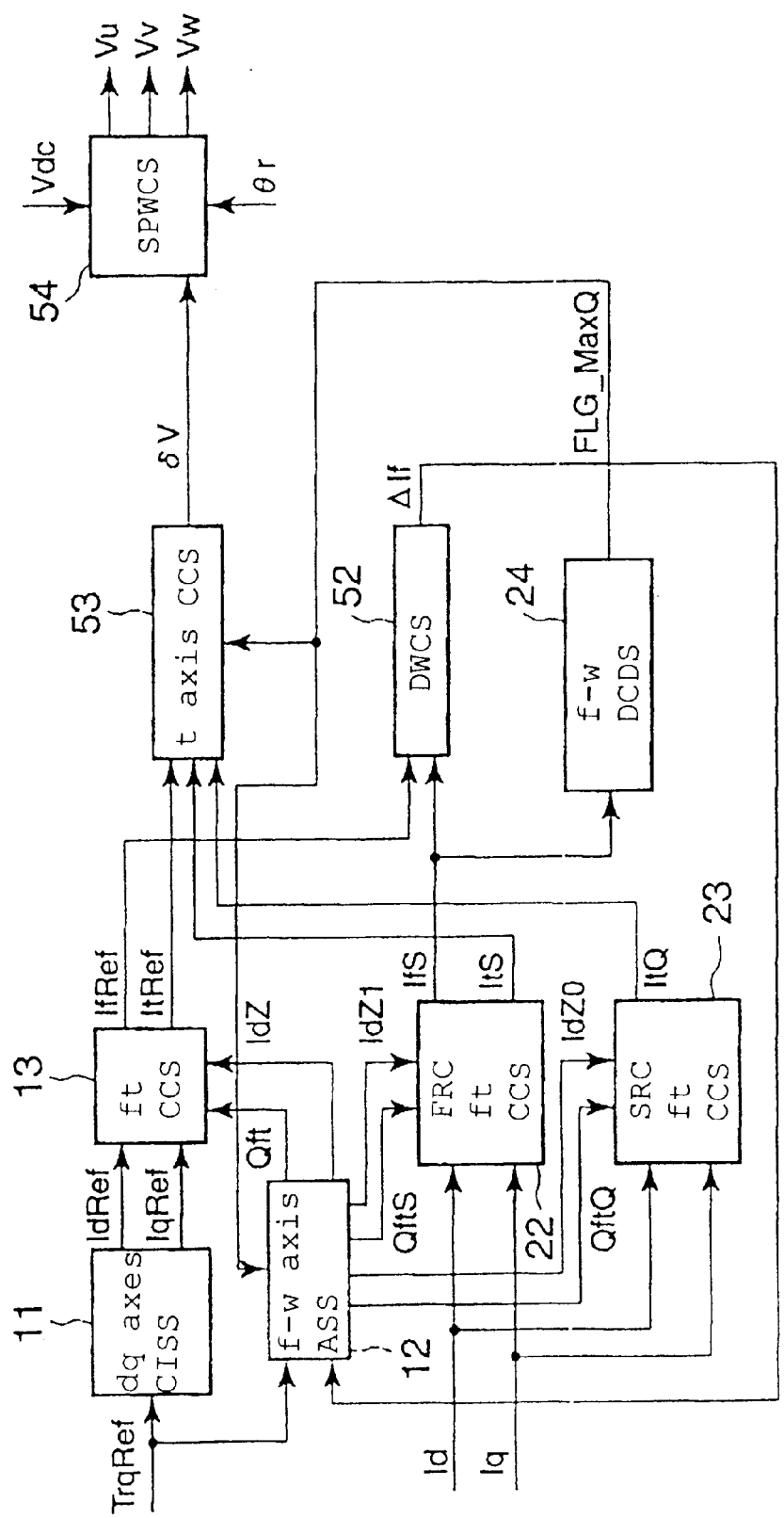
FIG. 11 is a functional block diagram given in explanation of the construction of a motor control device according to a seventh embodiment.

As shown in FIG. 11, the motor control device of the present embodiment is applied, as the main circuitry thereof, in the same way as in the case of the previous embodiment, to an inverter that drives a permanent magnet reluctance motor that generates a combined torque of the torque produced by a permanent magnet and reluctance torque and comprises a dq axes current instruction setting section 11, flux-weakening axis angle setting section 12, ft co-ordinate conversion section 13, first real current ft co-ordinate conversion section 22, second real current ft co-ordinate conversion section 23, flux-weakening direction changeover decision section 24, depth of weakening calculation section 52, t axis current control section 53 and single pulse waveform calculation section 54.

The operation of the constituent elements apart from flux-weakening direction changeover decision section 24 is the same as in the case of the sixth embodiment.

The operation of flux-weakening direction changeover decision section 24 is the same as the operation of flux-weakening direction changeover decision section 24 in the third embodiment.

Using a motor control device constructed as above, just as in the case of the sixth embodiment, under operating conditions wherein flux-weakening control can be performed while maintaining an equal-torque characteristic, an equal-torque characteristic is maintained; under operating conditions wherein flux-weakening control can no longer be performed while maintaining an equal-torque characteristic, stable flux-weakening control can be performed without creating control abnormalities.

In addition, the inverter voltage utilization factor (rate) can be increased, device costs lowered and improvement in efficiency can be achieved in combination by applying a single pulse waveform.

In each of the embodiments described above, the motor driven by an inverter to which the motor control device was applied was a permanent magnet reluctance motor that generated a combined torque of the torque produced by a permanent magnet and reluctance torque. However, the motor control device of the present invention is not only restricted to a permanent magnet reluctance motor but could also be applied to flux-weakening control of a permanent magnet motor or reluctance motor etc.

As described above, with the present invention, by making the direction of the current flowing for purposes of flux-weakening control variable in setting taking into account not only the torque instruction but also the magnitude of the flux-weakening current, it becomes possible to provide a motor control device that is capable of stable and effective flux-weakening control while outputting a torque that closely tracks the torque instruction, irrespective of the conditions under which the torque is output.

Obviously, numerous additional modifications and variations of the present invention of possible in light of the above teachings. It is therefore to be understood that within the scope of the appended claims, the present invention may be practiced otherwise than as specially described herein.

What is claimed is:

1. A motor control device, comprising:
    a torque instruction value section that supplies a torque instruction value for torque to be generated by a motor; and
    a flux-weakening axis angle setting section that, when said motor delivers output in accordance with said torque instruction value which is output by said torque instruction value section, when performing flux-weakening control in which a current instruction value is corrected so that a terminal voltage of said motor does not exceed a maximum voltage of an inverter output, variably sets a flux-weakening angle collected by said current instruction value in accordance with said torque instruction value,
    wherein said flux-weakening axis angle setting section sets said flux-weakening angle in a direction in which said torque is practically invariant.

2. The motor control device according to claim 1,
    wherein said flux-weakening angle setting section sets said flux-weakening angle in accordance with said torque instruction value and said current instruction value.

3. The motor control device according to claim 1,
    wherein said flux-weakening angle setting section sets said flux-weakening angle in accordance with said torque instruction value and a flux-weakening current feedback value.

4. The motor control device according to claim 1, further comprising:
    a changingover section over a direction along which flux-weakening control is performed in accordance with a first current feedback value of a perpendicular component with respect to a first direction of flux-weakening and a second current feedback value of a perpendicular component with respect to a second direction of flux-weakening,
    wherein said second direction of flux-weakening is set facing a direction of a center of an equipotential ellipse constituted on a dq axes current co-ordinates by said terminal voltage of the motor.

5. The motor control device according to claim 1,
    wherein said second direction of flux-weakening is set facing a direction of a center of an equipotential ellipse constituted on said dq axes current co-ordinates by said terminal voltage of said motor wherein a direction along which flux-weakening control is performed is changed over in accordance with a first perpendicular component value of said current instruction value with respect to a first direction of flux-weakening and a second perpendicular component value thereof with respect to said second direction of flux-weakening.

6. The motor control device according to claim 1,
    wherein, if said flux-weakening current instruction value that is output from said flux-weakening current calculation section exceeds a fixed value that is set beforehand, said direction of flux-weakening is altered in setting so as to be a direction practically perpendicular to an equipotential line in respect of said terminal voltage of said motor.

7. The motor control device according to claim 1,
    wherein, if said flux-weakening current feedback exceeds a fixed value that is set beforehand, a direction of flux-weakening is altered in setting so as to be a second flux-weakening direction facing a direction of a center of an equipotential ellipse constituted on said dq axes current co-ordinates by said terminal voltage of said motor.

8. A motor control device having a flux-weakening angle setting section that, when flux-weakening control is performed wherein a current instruction value is corrected so that a terminal voltage of said motor does not exceed a maximum voltage of an inverter output, variably sets a flux-weakening angle whereby correction is effected by said current instruction value in accordance with a torque instruction value, comprising:
    a single pulse waveform control section that controls a current so that a desired torque is obtained by altering a voltage phase, by outputting a single-pulse waveform that turns an inverter switching element ON/OFF once only in every cycle of an output frequency; and
    a voltage phase altering section that sets a flux-weakening angle in accordance with said torque instruction value in a direction wherein a torque is practically invariant and so that a current feedback component in a direction perpendicular to said flux-weakening angle becomes zero.

9. The motor control device according to claim 8,
    wherein setting of said flux-weakening angle is performed in accordance with said torque instruction value and a flux-weakening current feedback value.

10. The motor control device according to claim 8, further comprising:
    a changingover section over a direction in which flux-weakening control is performed in accordance with a first current feedback value of a component perpendicular to a first flux-weakening direction and a second current feedback value of a component perpendicular to a second flux-weakening direction, wherein said second flux-weakening direction is set facing a direction of a center of an equipotential ellipse constituted on said dq axes current co-ordinates by said terminal voltage of said motor.

11. The motor control device according to claim 8, wherein if a flux-weakening current feedback value exceeds a fixed value that is set beforehand, a direction of flux-weakening is changed in setting so as to become a second flux-weakening direction facing a direction of a center of an equipotential ellipse constituted on said dq axes current co-ordinates by said terminal voltage of said motor.

12. The motor control device according to claim 1, wherein said motor is a permanent magnet reluctance motor that generates a combined torque of torque produced by a permanent magnet and reluctance torque.

* * * * *